United States Patent
Lu et al.

(10) Patent No.: US 6,788,439 B2
(45) Date of Patent: Sep. 7, 2004

(54) DUAL TRANSMISSIVE/REFLECTIVE IMAGE SCANNING APPARATUS WITH PROTECTIVE APPARATUS

(75) Inventors: Jih-Yung Lu, Taipei (TW); Jung-Ying Tu, Taipei (TW)

(73) Assignee: BenQ Corporation (TW)

( * ) Notice: Subject to any disclaimer, the term of this patent is extended or adjusted under 35 U.S.C. 154(b) by 806 days.

(21) Appl. No.: 09/750,354

(22) Filed: Dec. 29, 2000

(65) Prior Publication Data

US 2002/0063857 A1 May 30, 2002

(30) Foreign Application Priority Data

Jun. 9, 2000 (TW) .......... 89111360 A

(51) Int. Cl.⁷ .......... H04N 1/04; G03G 15/04; H01L 27/00
(52) U.S. Cl. .......... 358/487; 358/497; 358/474; 358/475; 358/498; 399/211; 250/208.1
(58) Field of Search .......... 358/487, 497, 358/474, 475, 498; 399/211; 250/208.1

(56) References Cited

U.S. PATENT DOCUMENTS 5,814,809 A * 9/1998 Han .......... 250/208.1
6,169,611 B1 * 1/2001 Brook et al. .......... 358/487

* cited by examiner

*Primary Examiner*—Edwards Coles
*Assistant Examiner*—Houshang Safaipour
(74) *Attorney, Agent, or Firm*—Arent Fox

(57) ABSTRACT

The present invention relates to an image scanning apparatus and more particularly to a dual transmissive/reflective image scanning apparatus with protective apparatus. The present invention includes a housing, an original cover, a tray of a first type, and a tray of a second type. The housing provides a slot, within which the tray of the first type or the tray of the second type may be selectively inserted. The tray of the first type is inserted within the slot for reflective scanning, while on the other hand, the tray of the second type is selectively inserted within the slot for transmissive scanning. In addition, a first device is provided within the housing, and the tray of the first type has a second device for selectively coupling with the first device. The original cover has a third device for selectively coupling with the first device. The original cover is not allowed to open as the tray of the second type is inserted within the slot, whereas the original cover is allowed to open as the tray of the first type is inserted within the slot. As the original cover is open, the tray of the first type is not allowed to be withdrawn from the slot. However, as the original cover is closed, the tray of the first type or the tray of the second type is allowed to be withdrawn from the slot.

11 Claims, 13 Drawing Sheets

DUAL TRANSMISSIVE/REFLECTIVE IMAGE SCANNING APPARATUS WITH PROTECTIVE APPARATUS

FIELD OF THE INVENTION

The present invention relates to an image scanning apparatus and more particularly to a dual transmissive/reflective image scanning apparatus with protective apparatus.

BACKGROUND OF THE INVENTION

Typically, there are three main categories of image scanning apparatuses including transmissive scanners for scanning transparent originals such as slides and transparencies, reflective scanners for scanning opaque originals such as documents and photographs, and transmissive/reflective scanners for scanning both transparent originals and opaque originals.

A conventional transmissive/reflective scanner includes a glass platen upon which either a transparent original or an opaque original is placed. When scanning the transparent original, a light source from the original cover illuminates through not only the transparent original but also the glass platen. Usually the original cover provides another glass platen on one surface, and this glass platen is in touch with the original when scanning. However, glass may cause reflection and refraction, and loss of light is resulted as light passes through. Additionally, greasy dirt and dust easily gather on the glass platen during use. When original is placed upon or retrieved from the glass platen, the glass platen is easily smudged. With the conventional scanner, only dirt or dust deposited on the upper surface of the glass platen is allowed to be cleaned. That deposited on the lower surface of the glass platen can not be cleaned because the glass platen is not allowed to be taken out from the housing. Moreover, with the design of two glass platens, image deformation may bring about as the transparent original is placed between the two glass platens which are not substantially parallel to or contact tightly to each other.

A transmissive/reflective image scanning apparatus has been disclosed in U.S. Pat. No. 5,574,274. It provides a light source within the inner of the housing instead of within the original cover for transmissive scanning purpose. Although some of the problems have been solved, it leads to a higher manufacturing cost due to the complication of the light travelling pathway.

In order to solve the aforementioned problems, the present invention provides two types of trays, which are used for transparent originals or opaque originals respectively. When scanning transparent objects, no glass is present on the housing so that the light source only passes through the glass of the original cover. Therefore, a high scanning quality is achieved.

However, the image scanning apparatus of the present invention has a cavity defined on the upper surface of the housing. When the original cover is in an open state and the cavity is not protected, external objects or dust may enter the housing via the cavity.

The present invention further provides a protective apparatus, which prevents the external objects of dust from entering the housing via the cavity.

SUMMARY OF THE INVENTION

The present invention relates to an image scanning apparatus and more particularly to a dual transmissive/reflective image scanning apparatus with protective apparatus. The present invention provides a tray of a first type for reflective scanning and a tray of a second type for transmissive scanning.

The present invention has a slot within which the tray of the first type or the tray of the second type may be selectively inserted. The tray of the first type is inserted within the slot for reflective scanning, while on the other hand, the tray of the second type is selectively inserted within the slot for transmissive scanning. When scanning transparent originals, a light source from the original cover passes directly through the transparent originals. Since the light passes through only one glass platen, loss of light is lower than the prior art. Furthermore, either the tray of the first type or the tray of the second type is allowed to be withdrawn from the housing for cleaning purpose.

The purpose of the present invention is to provide a protective apparatus to prevent external objects and dust from falling into the housing avoiding damage to the components inside the housing. The protection apparatus includes a first device, a second device, and a third device. The first device is provided inside the housing. The tray of the first type has the second device for selectively coupling with the first device. The original cover provides the third device for selectively coupling with the first device. The original cover is not allowed to open as the tray of the second type is inserted within the slot, whereas the original cover is allowed to open as the tray of the first type is inserted within the slot. As the original cover is open, the tray of the first type is not allowed to be withdrawn from the slot. However, as the original cover is closed, the tray of the first type or the tray of the second type is allowed to be withdrawn from the slot.

DETAIL DESCRIPTION OF THE PRESENT INVENTION

Figure 1:
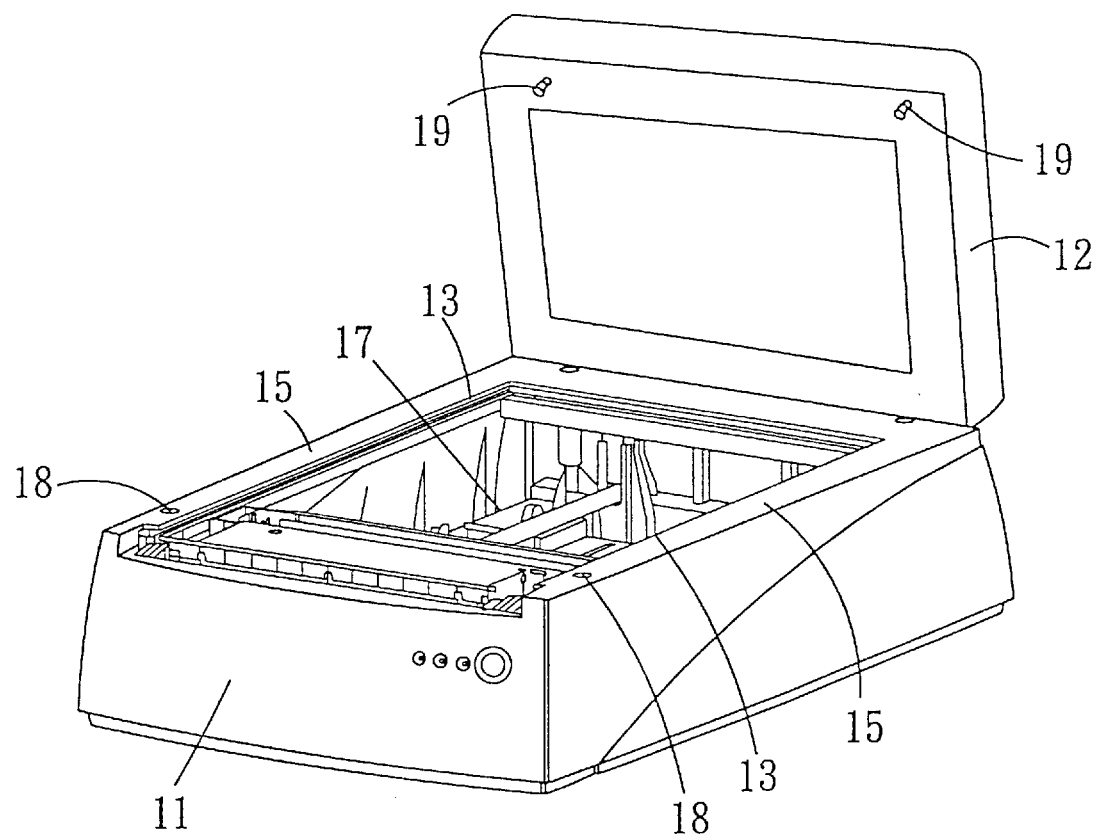
FIG. 1 shows the housing together with the original cover left open of the image scanning apparatus in order to show the cavity.
Figure 5:
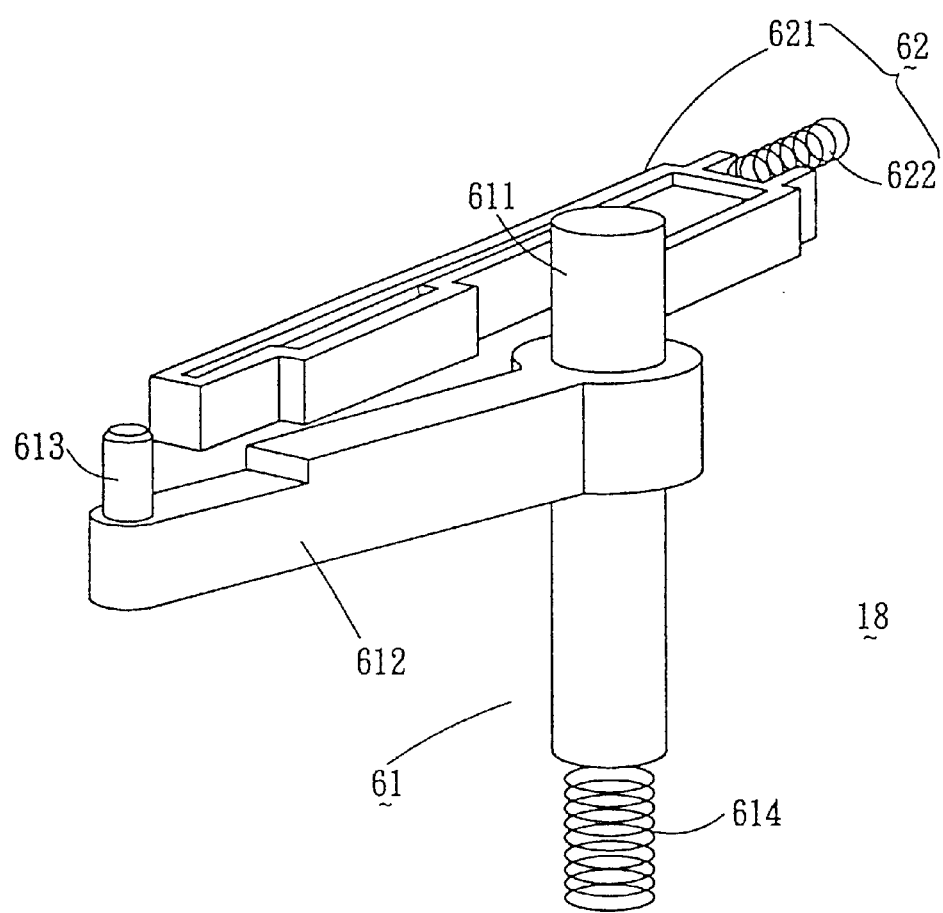
FIG. 5 illustrates the first device of the protection apparatus.
Figure 6:
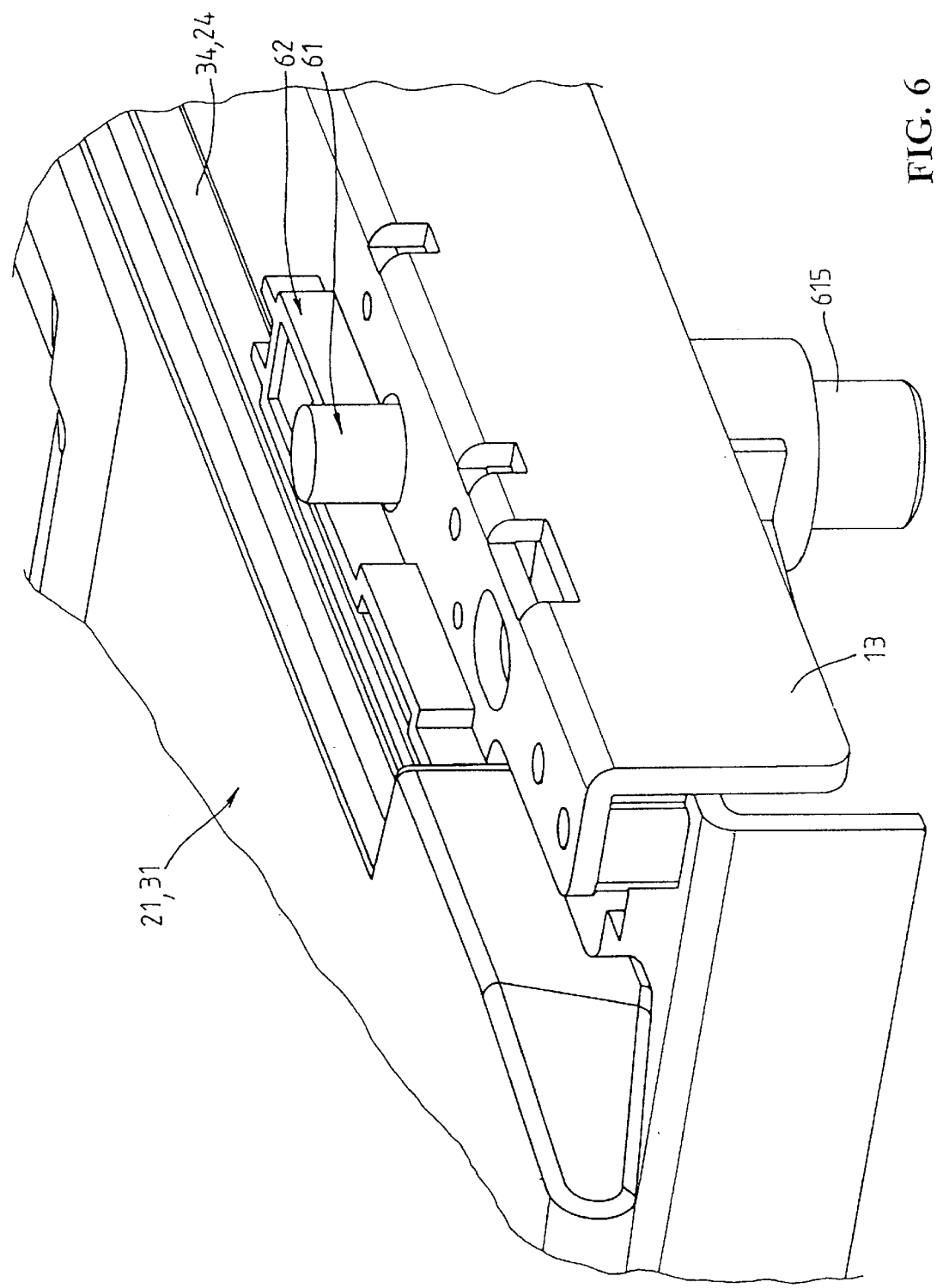
FIG. 6 illustrates the relation between the first device and the housing.
Figure 7:
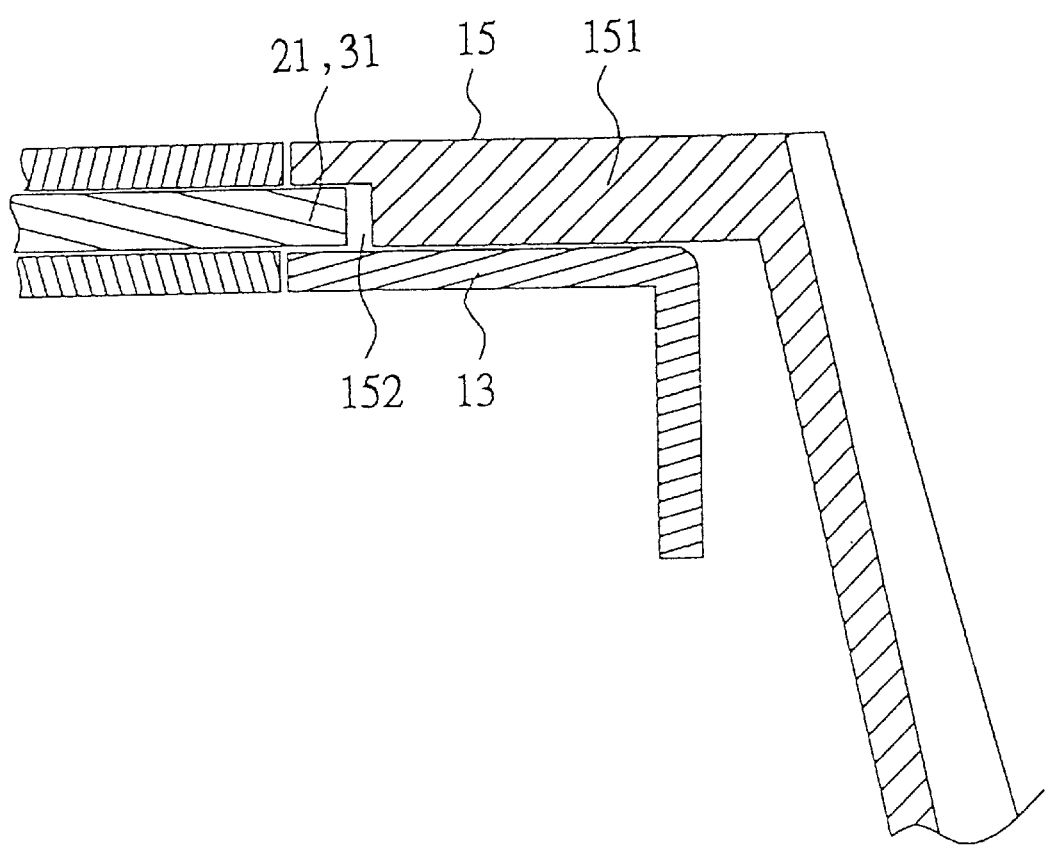
FIG. 7 illustrates a sectional view with the tray of the first type or the tray of the second type being inserted within the slot.
Figure 9:
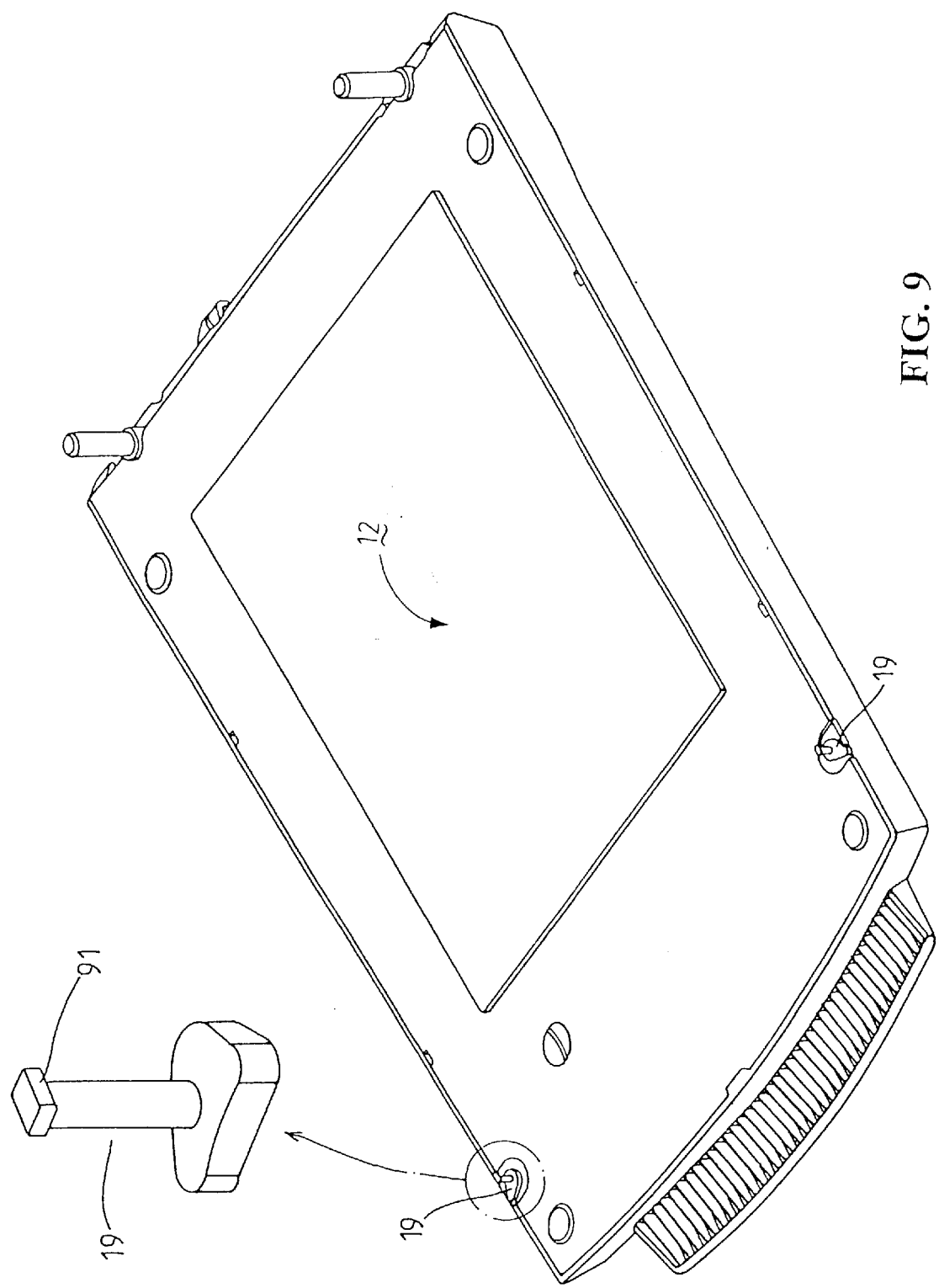
FIG. 9 illustrates the third device of the protection apparatus.

Referring initially to FIG. 1, the present invention includes a housing 11 and an original cover 12. The housing 11 has an upper surface 15 that provides a cavity 17 at a substantially central position. The original cover 12 is rotatably attached to the housing 11 to selectively cover the upper surface 15 of the housing 11. A light source (not shown), disposed inside the original cover 12, is used to illuminate transparent originals. The original cover 12 further includes a locking pin (third device) 19, as shown in FIG. 1 and FIG. 9. The functions of the locking pin 19 are further described hereinafter. Within the housing 11, a frame 13 is provided along the edges of the cavity 17. Generally speaking, the frame 13 is formed at the inner surface of the housing 11 along the left and right edges of the cavity 17. As shown in FIG. 6 and FIG. 7, the cross-section of the frame 13 is in substantially L-shape. A slot 152 is formed by an upper surface of the frame 13 and an inner surface of the housing shell 151, as shown in FIG. 7. The housing shell 151 together with frame 13 form a substantially U-shape structure defining the slot 152. The slot 152 is parallel to the edge of the cavity 17 of the housing 11 while opening of U-shape structure faces toward the center of the cavity 17 of the housing 11. A first device 18, as shown in FIG. 5, located inside the housing 11, corresponds to the locking pin 19. The functions of the locking pin 19 and the first device 18 are further described as follows.

Figure 2:
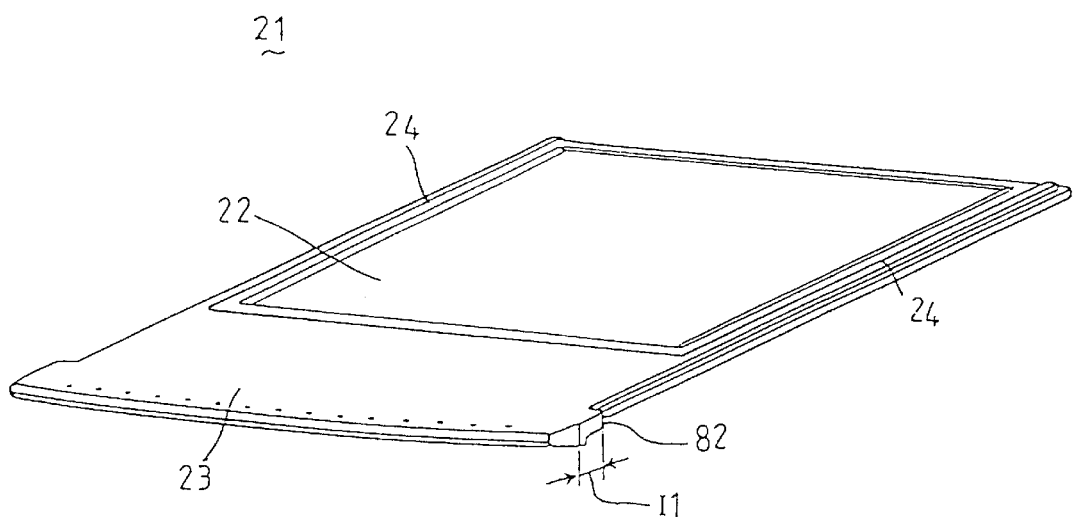
FIG. 2 illustrates the tray of the first type according to the present invention.

FIG. 2 illustrates the tray of the first type 21 used for reflective image scanning in accordance with the present invention. A transparent material device 22 is installed at a substantially central position of the tray of the first type 21. The preferred embodiment for the transparent material device is glass. A slide guide 24, formed respectively at both left and right edges of the tray of the first type 21, is used to slide within the slot 152. The tray of the first type 21 further includes a handle 23. As show in FIG. 8, a second device 25, including a hole 81 and a bulge edge 82, is located at the back of the handle 23 and close to the slide guide 24. The functions of the second device 25 are further described hereinafter.

Figure 3:
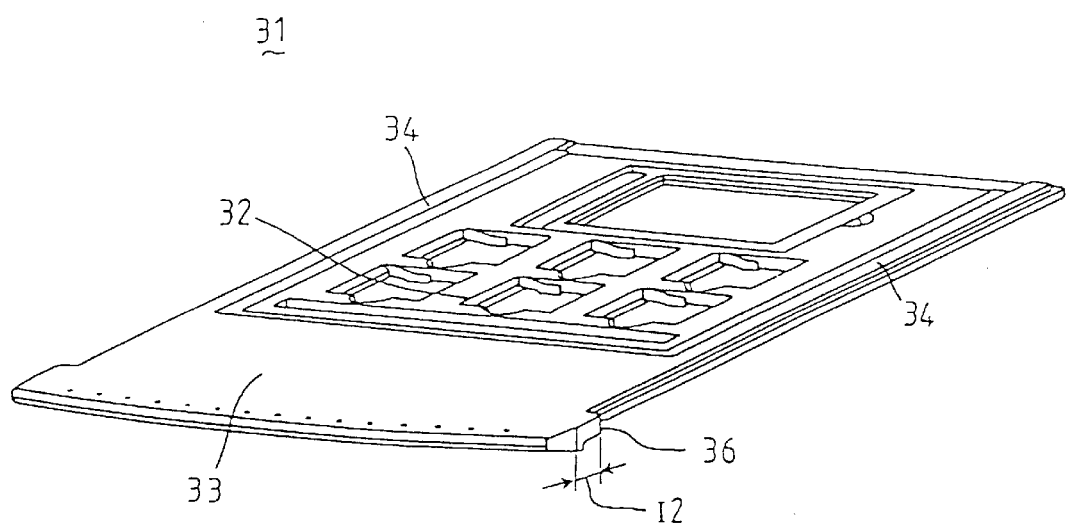
FIG. 3 illustrates the tray of the second type according to the present invention.
Figure 16:
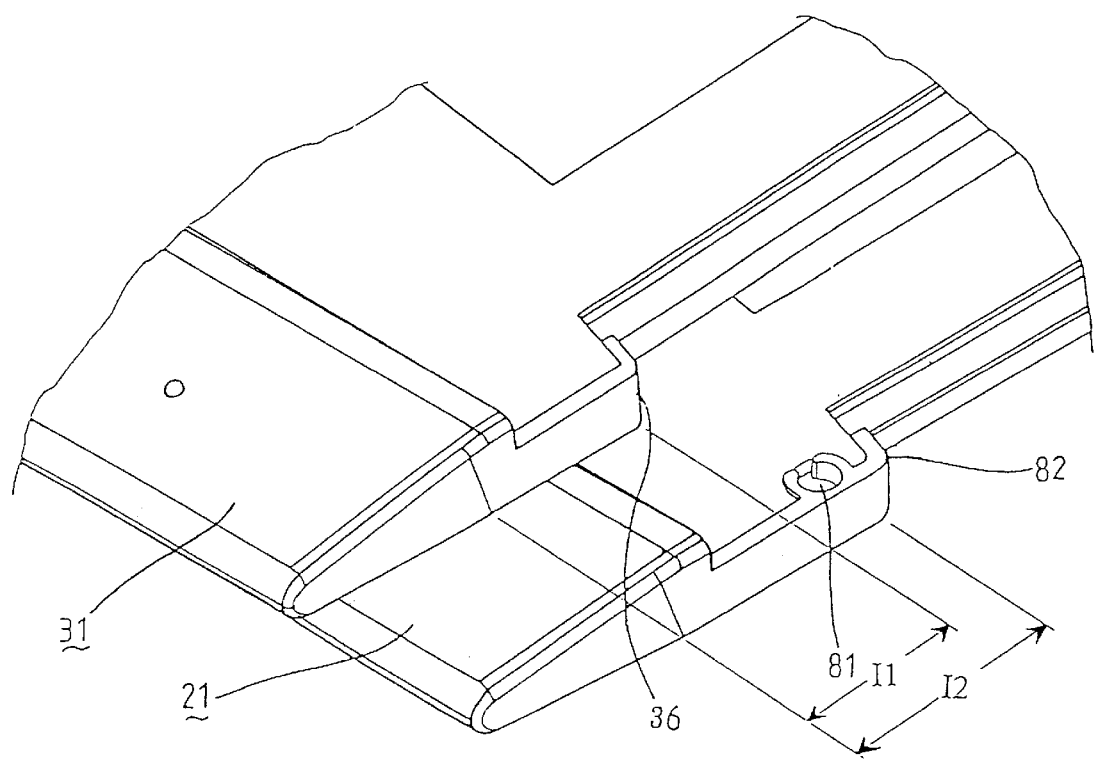
FIG. 16 compares the second device of the tray of the first type with a corresponding portion of the tray of the second type.

FIG. 3 illustrates the tray of the second type 31 used for transmissive image scanning in accordance with the present invention. At least one holder 32, installed at a substantially central position in the tray of the second type 31, is used to hold transparent originals thereon. A slide guide 34, formed respectively at both left and right sides of the tray of the second type 31, is used to slide within the slot 152. The tray of the second type 31 further includes a handle 33 and a bulge edge 36. The length I2 of the bulge edge 36 on the tray of the second type 31 is shorter than the length I1 of the bulge edge 82 on the tray of the first type 21, as shown in FIG. 2, FIG. 3, and FIG. 16.

Figure 4:
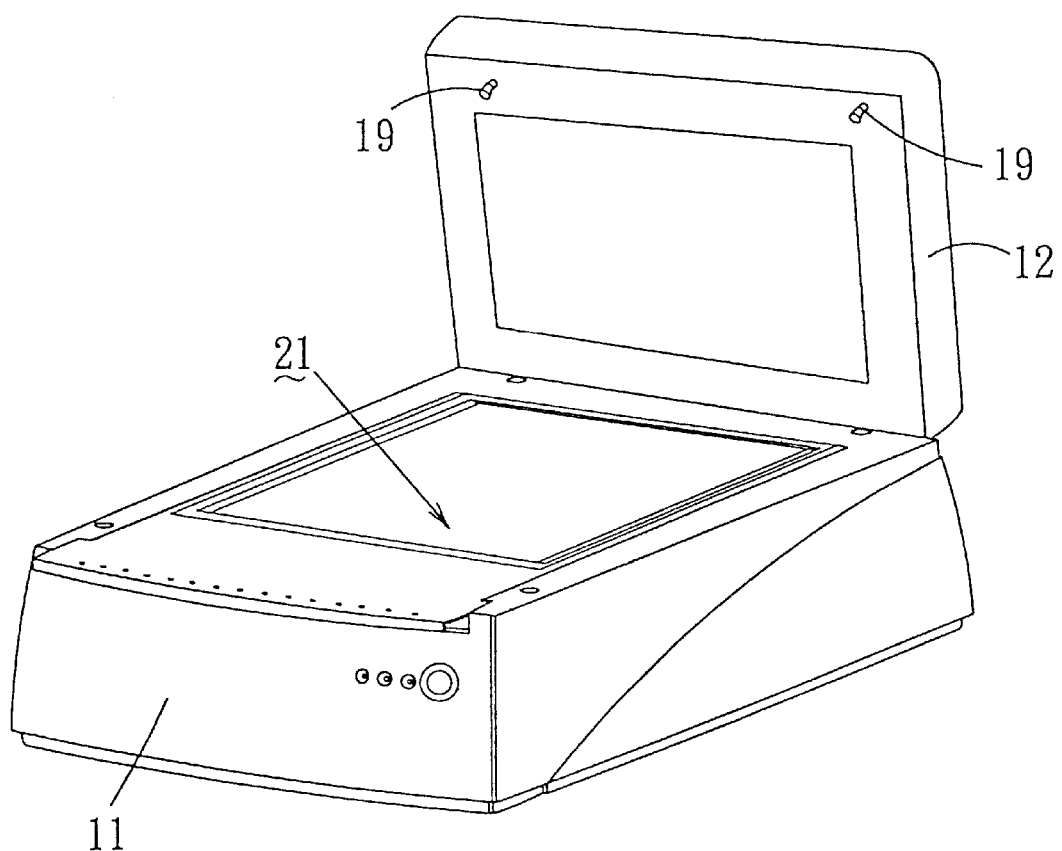
FIG. 4 illustrates the invention with the tray of the first type completely inserted within the slot.

Either the tray of the first type 21 or the tray of the second type 31 is allowed to be inserted within the slot 152, as shown in FIG. 7 during scanning operation. FIG. 4 illustrates the tray of the first type 21 that is completely inserted within the slot 152.

For reflective scanning, the tray of the first type 21 is inserted within the slot 152. For transmissive scanning, the tray of the second type 31 is inserted within the slot 152. When the tray of the second type 31 is inserted within the slot 152 for transmissive scanning, the light source (not shown) in the original cover 12 passes through the transparent originals. Thus, a good scanning quality is achieved. However, since the tray of the second type 31 is not provided with a glass, the cavity 17 on the upper surface of the housing 11 is not completely closed up. Under the condition and as the original cover 12 is open, external objects or dust may fall into the housing via the cavity 17. Therefore, the present invention further includes a protective apparatus as described hereinafter. The protective apparatus includes the aforementioned first device 18, the second device 25 and the third device 19.

FIG. 5 illustrates the first device 18 in accordance with the present invention. The first device 18, located inside the housing 11, includes a lock device 61 and a slider device 62. The lock device 61 includes a vertical rod 611, a transverse rod 612, a catch 613 and a spring 614. The transverse rod 612 is perpendicularly connected to the vertical rod 611. The catch 613 is fixed to one end of the transverse rod 612. The slider device 62 including a sliding block 621 and a spring 622 is allowed to move horizontally with respect to the upper surface of the frame 13 (as shown in FIG. 6) within the slit (not shown).

As shown in FIG. 6, FIG. 10, FIG. 11, FIG. 13, and FIG. 14, the lock device 61 is located inside a sleeve member 615 which is fixed to the frame 13 of the housing 11. The sleeve member 615 includes a first space (not shown) to accommodate the vertical rod 611 and the spring 614, such that the vertical rod 611 is movable along a vertical direction with respect to the upper surface of the frame 13 within the first space of the sleeve member 615. The sleeve member 615 further includes a second space to accommodate the transverse rod 612, such that the transverse rod 612 is movable along a vertical direction with respect to the upper surface of the frame 13 within the second space of the sleeve member 615. Therefore, the lock device 61 is allowed to move vertically with respect to the upper surface of the frame 13 within the sleeve member 615. The slider device 62 is disposed within a slit (not shown) which is formed within the housing 11. The slider device 62 is allowed to move horizontally with respect to the upper surface of the frame 13 within the slit (not shown).

As shown in FIG. 7, the frame 13, which is fixed to an inner surface of the housing shell 151, is in substantially L-shape. A slot 152 is formed by the upper surface of the frame 13 and the inner surface of the housing shell 151. Either the slide guide 24 of the tray of the first type 21 or the slide guide 34 of the tray of the second type 31 slides within the slot 152.

Figure 8:
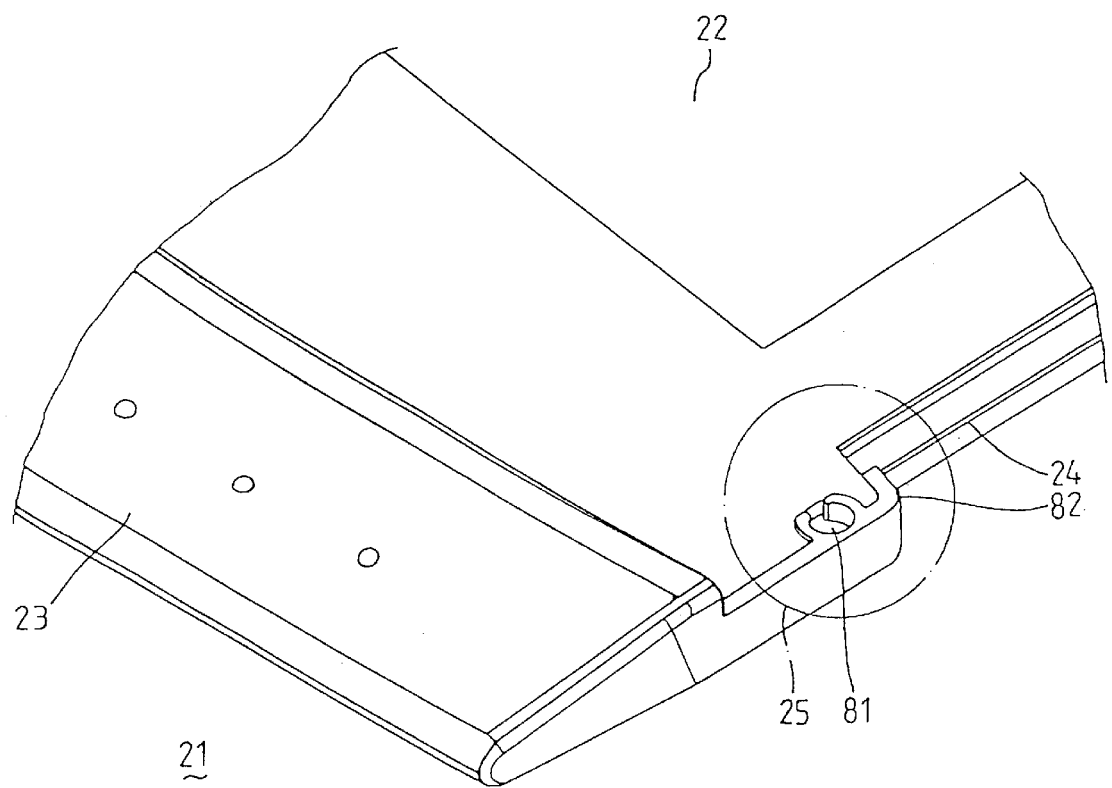
FIG. 8 illustrates the second device according to the present invention.

FIG. 8 is the second device 25 in accordance with the present invention. The second device 25, located at the bottom of one side of the tray of the first type 21 and close to the slide guide 24, includes a hole 81 and a bulge edge 82. The hole 81 coupling with the catch 613 of the first device 18 selectively locks or unlocks the tray of the first type 21. The bulge edge 82 coupling with the sliding block 621 of the first device 18 (as shown in FIG. 5) selectively locks or unlocks the original cover 12, as described below.

Figure 10:
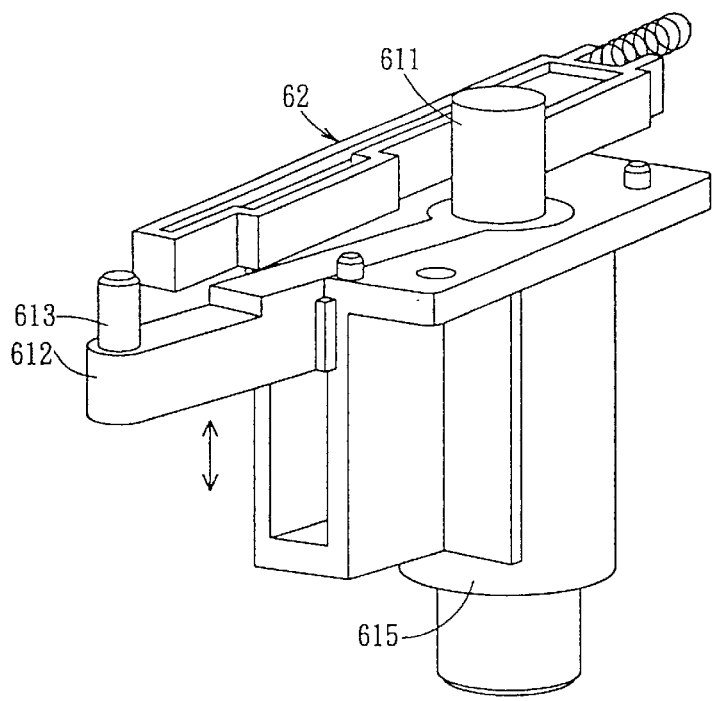
FIG. 10 illustrates the state of the first device as the tray of the first type is locked.
Figure 11:
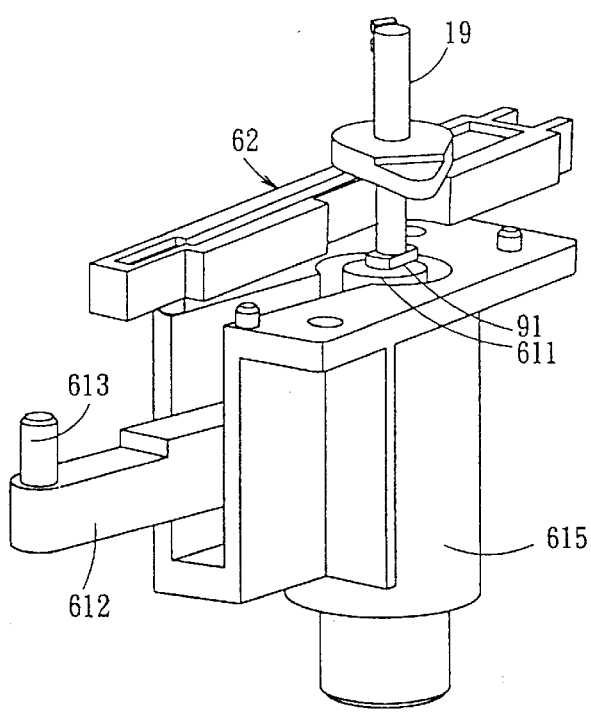
FIG. 11 illustrates the state of the first device as the tray of the first type is unlocked.
Figure 12:
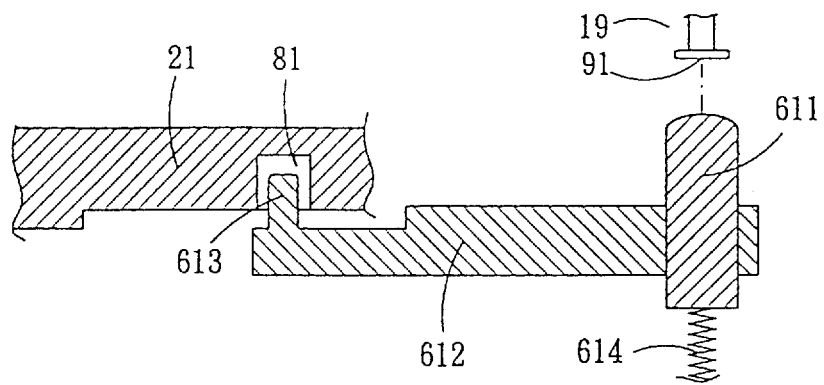
FIGS. 12(a) and (b) respectively illustrate the states of the tray of the first type being locked and unlocked in sectional views.
Figure 12:
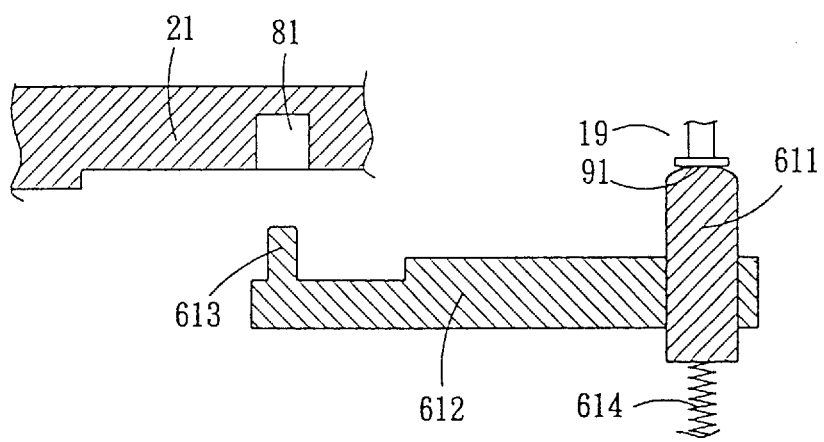
Figure 13:
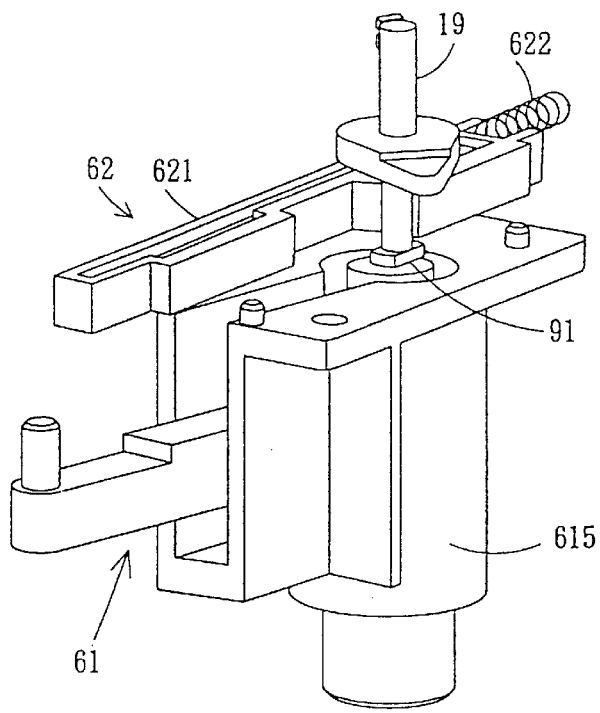
FIG. 13 illustrates the states of the first device and the third device as the original cover is locked.
Figure 14:
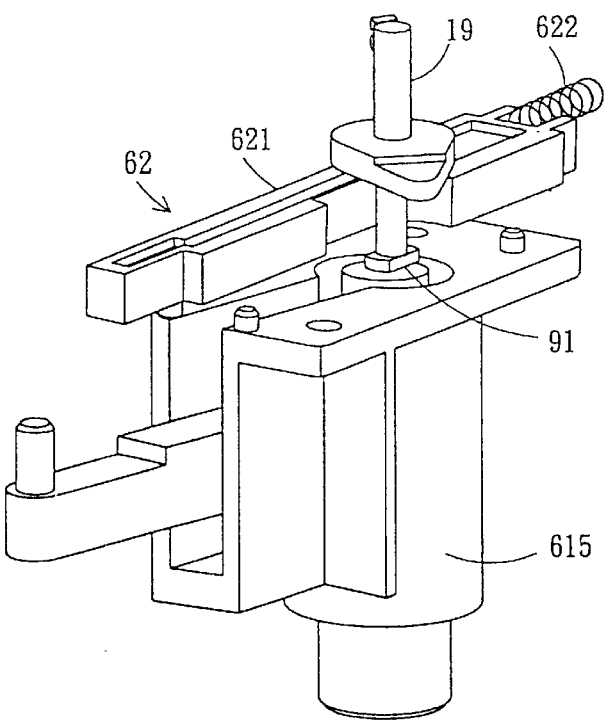
FIG. 14 illustrates the states of the first device and the third device as the original cover is unlocked.
Figure 15:
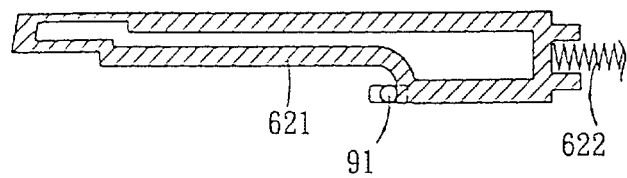
FIGS. 15 (a), (b), and (c) respectively illustrate the states of the slider of the first device and the head of the third device as the original cover is locked and unlocked.
Figure 15:
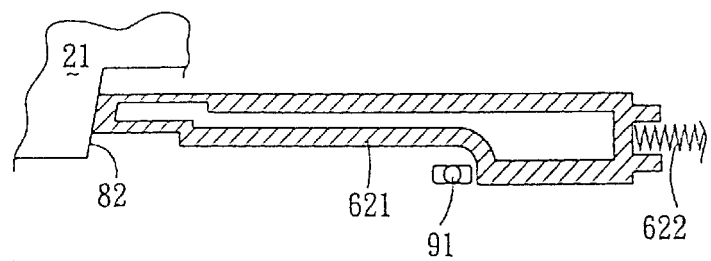
Figure 15:
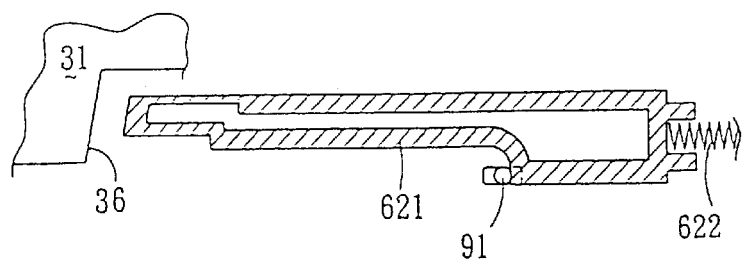

FIG. 9 shows the third device 19 in accordance with the present invention. The third device 19 is located on the original cover 12. The preferred embodiment of the third device 19 is a locking pin aforementioned. The locking pin 19 includes a head 91. The head 91 coupling with the vertical rod 611 of the lock device 61 selectively locks or unlocks the tray of the first type 21, as shown in FIG. 10, FIG. 11, FIGS. 12(a) and (b). The head 91 coupling with the sliding means 62 selectively locks or unlocks the original cover 12, as shown in FIG. 13, FIG. 14, FIG. 15(a), (b), and (c).

The first device 18, the second device 25, and the third device 19 as mentioned above are combined to form the protective apparatus of the invention. As the tray of the second type 31 is inserted within the slot 152, the original cover 12 is not allowed to open, because the head 91 of the third device 19 are coupled to locked the original cover 12 (as shown in FIG. 15(c)). When the original cover 12 is open, the tray of the first type 21 is not allowed to be withdrawn from the slot 152. Only when the original cover 12 is closed, the tray of the first type 21 or the tray of the second type 31 is allowed to be withdrawn from the slot 152. Therefore, external objects or dust will not fall into the housing 11 via the cavity 17. When the tray of the first type 21 is inserted within the slot 152, the original cover 12 is allowed to open. Since the cavity 17 is totally closed up by the tray of the first type 21, external objects or dust will not fall into the housing 11.

In order to further describe in detail, the following operational descriptions are provided.

(1) The tray of the first type 21 used for reflective image scanning is locked or unlocked As shown in FIG. 10 and FIG. 12(a), as the tray of the first type 21 is inserted within the slot 152 and the original cover 12 is open, the head 91 of the locking pin 19 disengages from the vertical rod 611 of the lock device 61. And then the spring 614, located inside the sleeve member 615, pushes the vertical rod 611 to move upward. Therefore, the catch 613 engages with the hole 81 of the tray of the first type 21, and the tray of the first type 21 is locked and is not allowed to be withdrawn from the slot 152.

As shown in FIG. 11 and FIG. 12(b), as the tray of the first type 21 is inserted within the slot 152 and the original cover 12 is closed, the head 91 of the locking pin 19 engages with and compresses the spring 614 of the lock means 61. And then the vertical rod 611 moves downward and drives the transverse rod 612 downward. Thus, the catch 613 disengages from the hole 81 of the tray of the first type 21, and the tray of the first type 21 is unlocked and is allowed to be withdrawn from the slot 152.

(2) The original cover 12 is locked or unlocked As shown in FIG. 13 and FIG. 15(a) and FIG. 15(c), as the original cover 12 is closed and either (1) the tray of the second type 31 is inserted within the slot 152, or (2) neither the tray of the first type 21 nor the tray of the second type 31 is inserted within the slot 152 in FIG. 15(a), the spring 622 forces the sliding block 621 to move horizontally and blocks the head 91 of the third device 19. Therefore the third device 19 is locked and is not allowed to move upward, and the original cover 12 is not allowed to open.

As shown in FIG. 14 and FIG. 15(b), as the original cover 12 is closed and the tray of the first type 21 is inserted within the slot 152, the bulge edge 82 (also shown in FIG. 8) of the tray of the first type 21 compresses the sliding block 621 to disengage the sliding block 621 from the head 91. Therefore the original cover 12 is allowed to open.

As shown in FIG. 15(c) and FIG. 16, when the original cover 12 is closed and the tray of the second type 31 is inserted within the slot 152, the bulge edge 36 of the tray of the second type 31 does not compress the sliding block 621 because it is shorter than the bulge edge 82 of the tray of the first type 21. The head 91 of the third device 19 remains locked by the sliding block 621 and therefore the original cover 12 is not allowed to open.

(3) The tray of the second type 31 used for transmissive image scanning is locked or unlocked As shown in FIG. 16, the length l1 of the bulge edge 36 of the tray of the second type 31 is shorter than the length l2 of the bulge edge 82 of the tray of the first type 21, and the tray of the second type 31 does not provide a hole as the hole 81. Therefore, the tray of the second type 31 and the lock device 61 of the first device 18 do not lock each other, and the tray of the second type 31 may be selectively inserted within or withdrawn from the slot 152.

What is claimed is:

1. An image scanning apparatus, comprising:

a housing, the housing having an upper surface and a slot means, a cavity being provided at substantially a central position of the upper surface, the slot means selectively accommodating a tray of a first type and a tray of a second type, as the tray of the first type is inserted within the slot means, a reflective scanning operation is performed over an original disposed on the tray of the first type, and as the tray of the second type is inserted within the slot means, a transmissive scanning operation is performed over an original disposed on the tray of the second type, the housing including a first means, the tray of the first type including a second means for selectively coupling with the first means;

an original cover rotatably connected to the housing and selectively covering the upper surface, the original cover including a third means for selectively coupling with the first means;

wherein, as the tray of the second type is inserted within the slot means, the original cover is not allowed to be in an open state, and as the original cover is in the open state, the tray of the first type is not allowed to be withdrawn from the slot means.

2. The image scanning apparatus according to claim 1, wherein as the tray of first type is inserted within the slot means, the original cover is allowable to be open, and only as the original cover is in a close state, the tray of the first type or the tray of the second type is allowable to be withdrawn from the slot means.

3. The image scanning apparatus according to claim 1, wherein the slot means is formed by an upper surface of a frame and an inner surface of the housing, a cross-section of the frame is in substantially L-shape, the slot means is parallel to a first direction of the housing, and an opening defined by the slot means points towards a second direction of the housing, the tray of the first type or the tray of the second type may be selectively inserted within and slides within the slot means along the first direction.

4. The image scanning apparatus according to claim 1, wherein, a means of transparent material is provided at a main portion of the tray of the first type, and as the tray of the first type is inserted within the slot means, the means of transparent material close up the cavity.

5. The image scanning apparatus according to claim 1, wherein at least one holder is provided at a main portion of the tray of the second type for accommodating an original of transparent type.

6. The image scanning apparatus according to claim 3, wherein the first means comprises a lock means and a slider means, the lock means is disposed within a sleeve member and is movable along a vertical direction with respect to the upper surface of the frame, the sleeve member is connected to an internal portion of the housing, the slider means is disposed within a slit provided in the housing, the slider means is movable horizontally with respect to the upper surface of the frame within the slit.

7. The image scanning apparatus according to claim 6, wherein the lock means comprises a first rod, a second rod, and a catch, the second rod is connected to the first rod at a substantially vertical direction, the catch is connected to an end of the second rod.

8. The image scanning apparatus according to claim 7, wherein the second means comprises a hole and a bulge edge, the hole of the second means selectively couples with the catch, the bulge edge selectively couples with the slider means, and as the tray of the first type is completely inserted within the slot means and the original cover is in the open state, the first rod moves upward to drive the second rod such that the catch engages with the hole of the second means, whereby the tray of the first type is locked and is not allowable to be withdrawn from the slot means.

9. The image scanning apparatus according to claim 8, wherein as the tray of the first type is completely inserted within the slot means and the original cover is in the close state, the third means presses against the first rod, and the first rod moves downward to drive the second rod such that the catch disengages from the hole of the second means, whereby the tray of the first type is unlocked and is allowable to be withdrawn from the slot means.

10. The image scanning apparatus according to claim 9, wherein the third means comprises a locking pin, and as the tray of the first type is not inserted within the slot means and the original cover is in the close state, the locking pin is locked by the slider means such that the original cover is not allowed to open.

11. The image scanning apparatus according to claim 10, wherein as the tray of the first type is inserted within the slot means and the original cover is in the close state, the bulge edge presses against the slider means such that the slider means disengages from the locking pin, whereby the original cover is allowable to open.

* * * * *